US005105915A

United States Patent [19]

Gary

[11] Patent Number: 5,105,915

[45] Date of Patent: Apr. 21, 1992

[54] WHEELCHAIR LIFTING DEVICE

[76] Inventor: Jerry M. Gary, 9640 E. Baytree Cir., Tucson, Ariz. 85749

[21] Appl. No.: 633,140

[22] Filed: Dec. 24, 1990

[51] Int. Cl.[5] .......................... B66F 3/22; B62D 61/12

[52] U.S. Cl. ...................................... 187/18; 187/9 R; 298/23 MD; 414/495; 414/921; 14/71.3

[58] Field of Search ............... 414/495, 921, 678, 537; 187/8.72, 9 R, 18; 14/71.1, 71.3, 71.5; 298/23 MD

[56] References Cited

U.S. PATENT DOCUMENTS

| | | | |
|---|---|---|---|
| 2,261,099 | 10/1941 | Fairbanks | 298/23 MD |
| 2,661,927 | 12/1953 | Hulsart . | |
| 3,806,092 | 4/1974 | Richards | 414/495 X |
| 3,880,259 | 4/1975 | Richards | 187/18 |
| 3,888,463 | 6/1975 | O'Brien . | |
| 3,991,857 | 11/1976 | Wolk et al. | 187/18 |
| 4,052,106 | 10/1977 | Louderback, Sr. | 298/23 MD |
| 4,158,524 | 6/1979 | Serafin | 414/678 |
| 4,365,692 | 12/1982 | Craig et al. | 187/8.72 |
| 4,392,771 | 7/1983 | Smalley | 414/921 X |
| 4,457,402 | 7/1984 | Del Vecchio | 187/12 |
| 4,488,326 | 12/1984 | Cherry | 414/495 |
| 4,576,539 | 3/1986 | Williams | 187/12 |
| 4,664,584 | 5/1987 | Braun et al. | 414/921 X |
| 4,674,601 | 6/1987 | Benjamin | 187/1 R |
| 4,790,716 | 12/1988 | McConnell | 414/678 |
| 4,907,936 | 3/1990 | Bourdage | 187/9 R X |
| 5,040,936 | 8/1991 | Rhea | 187/9 R X |

FOREIGN PATENT DOCUMENTS

| | | | |
|---|---|---|---|
| 1187147 | 9/1959 | France | 414/495 |
| 57-186542 | 11/1982 | Japan | 414/921 |
| 62-46731 | 2/1987 | Japan | 414/921 |

*Primary Examiner*—Robert J. Spar
*Assistant Examiner*—Robert S. Katz
*Attorney, Agent, or Firm*—Antonio R. Durando; Harry M. Weiss

[57] ABSTRACT

A wheelchair lift that consists of a horizontal platform mounted on a hydraulic elevator operable by the wheelchair occupant. A pivotable back panel of the platform provides a ramp for access to its top from ground level when the elevator frame is completely contracted and the platform is at its lowest position. The back ramp, together with a front gate and a system of lateral rails insures the stability and safety of the wheelchair on top of the platform, which can then be raised to the desired height by the occupant. The elevator arrangement is designed for fast response, so that the invention can be effectively used not only to move a wheelchair to a different plane for locomotion, but also for applications that require frequent adjustments to different heights.

6 Claims, 2 Drawing Sheets

WHEELCHAIR LIFTING DEVICE

BACKGROUND OF THE INVENTION

1. Field of the Invention

This invention pertains to the general field of equipment used to lift people confined to wheelchairs in order to help them function normally within the constraints provided by appliances and apparatus designed without regard to the special requirements resulting from their disabilities. In particular, it provides a new and improved way of lifting a wheelchair to a variable height for use either as an adjustable chair or as a means for ramping to a higher elevation.

2. Description of the Prior Art

Although various designs of wheelchairs have been in use for centuries, only during the last couple of decades a serious effort has been made to accommodate the needs of disabled people and give them an equal opportunity to function normally in our society. As part of that effort, public facilities have been required to remove obstacles to the unhindered movement of wheelchairs on streets, sidewalks, and in buildings. The result has been a welcome change in the standard construction of these facilities to include ramps and similar structures to make it possible for people in wheelchairs to go places without unnecessary hardship.

Because of the room requirements involved in the placement of permanent ramps, which can be prohibitive for a high rise because of the low climbing grade needed to maintain easy and safe access, various devices have been developed to perform the same function within a more confined space. In principle, they all consist of means for lifting an occupied wheelchair from a lower to a higher level for specific applications. For example, U.S. Pat. No. 4,576,539 to Williams (1986) describes a wheelchair lifting device to provide access to public transit vehicles. It consists of a platform for supporting the wheelchair; a frame along which the platform is raised and lowered; and a chain/gear/sprocket system with driving means to elevate the platform. A hydraulic jack is used to position the frame, while the chain/gear/sprocket system is used to lift the platform for simplicity and smoothness of operation.

In U.S. Pat. No. 4,158,524 (1979), Serafin teaches a chair lift designed to provide access to buildings in general. It consists of a platform fixed to frame legs capable of pivoting around a stationary base. The platform is elevated as the legs move progressively from a horizontal to a vertical position. The legs are driven by a cable/spool system actuated by an electric motor.

U.S. Pat. No. 4,674,601 to Benjamin (1987) describes a stationary apparatus to gain access to an elevated doorway in a building. This invention consists of a canvas shoot anchored to rigid beams capable of pivoting around the door's threshold. The beams are driven by cables spooled from the upper portion of the door. Conceptually different in all respects from the present invention, the function of this apparatus is limited to providing access to and from a particular door.

U.S. Pat. No. 4,365,692 to Craig (1982) shows a lifting device similar to the apparatus disclosed by Serafin. It consists of a catwalk attached to legs anchored to a base and capable of pivoting from the horizontal to the vertical position, thus causing the rising of the catwalk. The disclosure is limited to drilling site applications and designed to provide a higher floor level for operations around the well bore.

U.S. Pat. No. 3,888,463 to O'Brien (1975) teaches a wheelchair lifting apparatus specifically designed for portability and variable lifting range. It comprises a platform elevated by hydraulic rams driven by a battery powered mechanism. The rams operate on lever arms that move the wheelchair platform to the desired elevation. Through a complicated lever system, the platform is maintained in a horizontal position during travel from ground to an elevated level.

In U.S. Pat. No. 4,457,402 (1984), Del Vecchio shows a stationary lift that combines traditional stairs and a wheelchair lifting platform for dual use. The platform hoist is an expandable scissor-lever assembly driven by a hydraulically activated piston rod.

U.S. Pat. No. 4,790,716 to McConnell teaches an apparatus to lift and position a wheelchair to allow for the provision of specialized services to its occupant, such as dental and similar work. The lifting device is based on scissor-type levers driven by a worm-screw/-chain/gear mechanism and a reversible motor. The inventive portion of this patent lies mainly in the specialized applications made possible by its use.

Finally, U.S. Pat. No. 2,661,927 to Hulsart (1953) discloses a general weight hoist for any suitable application. It describes a platform lifted on scissor-type levers driven by a continuous screw mechanism. The invention does not describe the use of rams to lift the platform and it does not address any application involving wheelchairs.

The main problem with the lifts and related equipment described above is that they involve complicated structures that are bulky and expensive, resulting in uneconomical application for the purposes intended here. They provide an alternative to ramps in order to move from one level to another, but they do not provide a means to adjustably position the elevation of a wheelchair to an efficient height for the task at hand. In addition, these machines tend to be slow in operation and inefficient for the job of raising the elevation of a relatively light load. Thus, they are not suitable for use in situations where the occupant may need or wish to change the elevation of the wheelchair frequently and promptly, such as at spectator events in theaters and arenas. Therefore, there still exists a need for a simpler, self-operated device for positioning a wheelchair at variable heights in order to enable a user either to perform otherwise uncomfortable duties in stationary fashion or to lift the wheelchair to a higher level for locomotion. It is the purpose of this invention to address these problems.

BRIEF SUMMARY OF THE INVENTION

One objective of this invention is the development of a wheelchair lift that is simple in construction and relatively compact for efficient installation in lieu of ramps for access to elevated locations.

Another purpose of the invention is a machine that can be used at specific locations, such as working stations and spectator stands, to provide an adjustable seating arrangement for people in wheelchairs.

Another objective of the invention is the improvement of the speed and smoothness of motion of existing apparatus for greater efficiency and safer utilization.

A further goal of the invention is the ability to remove the apparatus and locate it at a different site with relative ease, which requires the use of relatively light components.

Yet another objective of this invention is the realization of the above mentioned goals in an economical and commercially viable manner. This is done by utilizing simple components that are either already available in the open market or can be produced at competitive prices.

In accordance with these and other objectives, the wheelchair lift of this invention consists of a horizontal platform mounted on a hydraulic elevator operable by the wheelchair occupant. A pivotable back panel of the platform provides a ramp for access to its top from ground level when the elevator frame is completely contracted and the platform is at its lowest position. This back ramp, together with a front gate and a system of lateral rails insures the stability and safety of the wheelchair on top of the platform, which can then be raised to the desired height by the occupant. The elevator arrangement is designed for fast response, so that the invention can be effectively used not only to move a wheelchair to a different plane for locomotion, but also for applications that require frequent adjustments to different heights.

Various other purposes and advantages of this invention will become clear from its description in the specifications that follow, and from the novel features particularly pointed out in the appended claims. Therefore, to the accomplishment of the objectives described above, this invention consists of the features hereinafter illustrated in the drawings and examples, fully described in the detailed description of the preferred embodiment and particularly pointed out in the claims. However, such drawings and description disclose but one of the various ways in which the invention may be practiced.

DETAILED DESCRIPTION OF THE INVENTION

The essence of this invention is in the novel combination of known components and mechanisms to produce a more practical and efficient device to lift wheelchairs. All structural members are designed for safe operation employing a minimum amount of material in order to reduce the overall mass of the device. A wheelchair platform is elevated with vertical motion only and the lifting mechanisms and controls are all contained in a shallow area under the platform for maximum compactness and corresponding increasing versatility.

Figure 1:
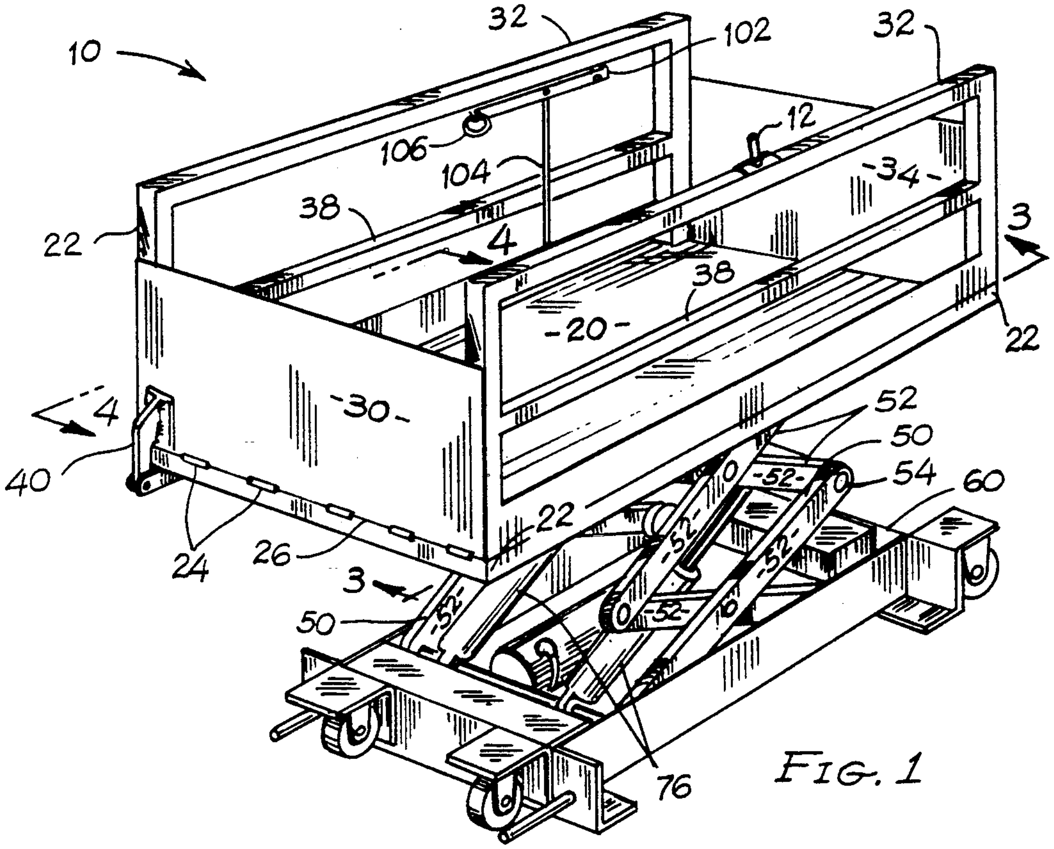
FIG. 1 illustrates a perspective view of one configuration of the wheelchair lift of this invention in an elevated position.
Figure 2:
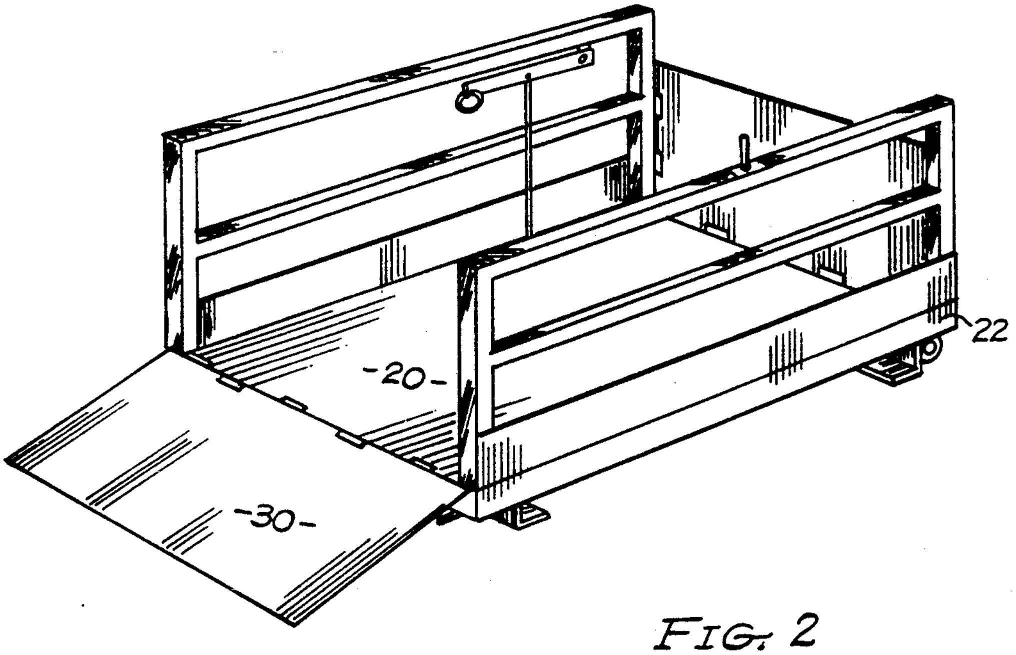
FIG. 2 illustrates a perspective view of the same embodiment of the invention at rest at ground level, showing the back side of the platform in an open position to function as a ramp for access to the top of the platform.

Referring to FIG. 1, a perspective view of the preferred embodiment of this invention 10 is shown. A wheelchair carrying platform 20, sized to receive a standard wheelchair occupied by a user, is bounded on each side by two rigid, vertical side rails 32, which extend upwards from the corners 22 of the platform, and by front and back panels 34 and 30, respectively. A reinforcing transverse brace 38 solidly connects the two vertical portions of each side rail 32 to form a one-piece unit to provide a strong handle bar and to retain the wheelchair securely in place during the use of the lift. The front panel 34 is attached to the front vertical portions of the side rails 32. On the other hand, the solid back panel 30 is fastened through multiple hinges 24 along the back edge 26 of the carrying platform 20 and can swing open to rest on the surrounding ground when the platform is lowered all the way, thus providing a ramp (shown in FIG. 2) for a wheelchair to be either pushed or wheeled onto the platform. In its closed position, the panel 30 provides a backstop to hold the wheelchair safely in position while on the platform. A lever arm 40, rigidly attached, as by welding, to the back panel 30, is actuated by a hydraulic ram and controls the position of the panel in its motion as it swings around the set of hinges 24. As explained in detail below, hydraulic pressure secures the closure of the back panel 30 in its vertical position.

Figure 3:
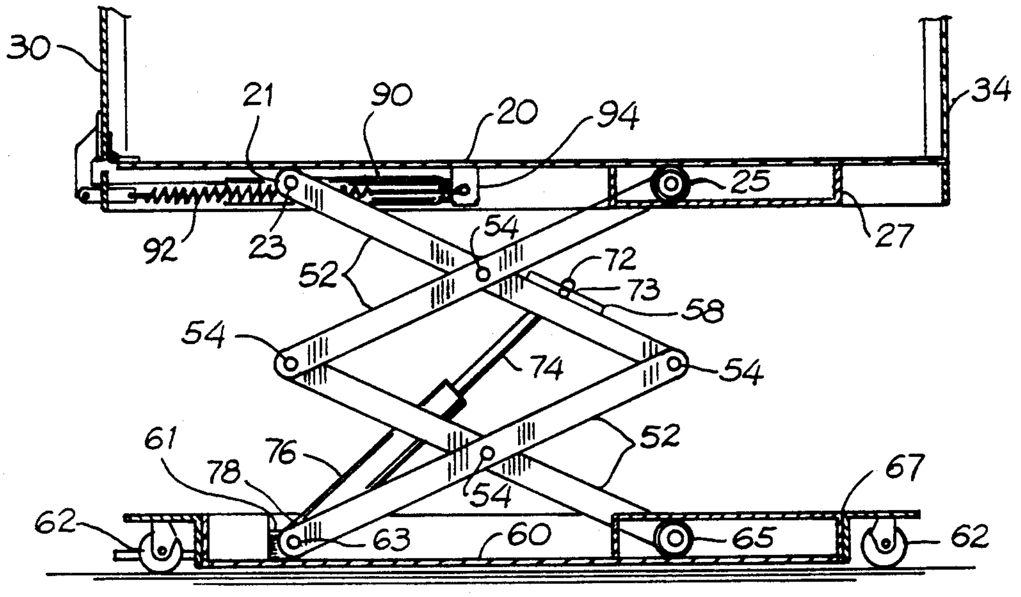
FIG. 3 is a cross-sectional view of the wheelchair lift taken from line 3—3 in FIG. 1, illustrating the functioning of the hydraulically driven scissor-lever assemblies.

The platform 20 is mounted on an elevator frame consisting of a pair of extendable scissor-lever assemblies 50 connected to the underside of the platform and to a supporting frame 60 on the ground. Each assembly 50 contains a multiplicity of levers 52, each of which is pivotally attached to another lever at each end and in the center by means of a bolt 54 or similar fastening device, so that the assembly expands and contracts in scissor-like fashion. As better illustrated in FIG. 3, the two top levers in each assembly are connected to one side of the platform's underside. The end of one lever is pivotally fastened through a bolt 23 or other similar device to a fixed post 21, while the other lever is connected to a support wheel 25 encased in a retaining housing 27 along which it rolls as the assembly expands and contracts with the vertical motion of the platform 20. The bottom of the platform rests on the two wheels 25 provided by the two scissor-lever assemblies 50 on each side of the platform and it is maintained in a horizontal position as it travels vertically while each wheel rolls horizontally along the interior of its housing 27 to allow the free movement of the scissor-lever mechanism. An equivalent arrangement, consisting of a fixed post 61 pivotally connected to one of the bottom levers 52 by a bolt or pin 63 and of a roller wheel 65 mounted on the other bottom lever and encased in the retaining housing 67, is used to fasten the bottom of each assembly to the supporting frame 60. This frame is equipped with four casters 62 for easy movement of the wheelchair lift 10. The position of these casters is adjusted by a screw-like mechanism (not shown in the figures), so that they can be elevated from the floor to cause the underside of the frame to rest directly on the floor for greater stability. When it becomes necessary to move the apparatus, the casters can be lowered for that purpose and then readjusted, as is often provided for the movement of heavy equipment.

A transverse brace 58 is rigidly attached, as by welding, to the top lever of each scissor-lever assembly 50 in order to provide reinforcement to the unit and an anchor for the elevator's hydraulic rams. As shown in side view in FIG. 3, the tip 72 of the piston rod 74 of a hydraulic ram 76 is hinged on a supporting bolt or similar device 73 on the brace 58 on one side of the elevator frame, while the tip 78 of the ram's cylinder is hinged on the support frame 60. A second hydraulic ram is mounted in the same way on the other side of the lift. Thus, as these two rams expand and push against the brace 58, the scissor-lever assemblies open and the wheelchair platform rises. The roller wheels 25 and 65 provide the necessary freedom of motion to permit the assemblies to expand and contract with the hydraulic rams. The dimensions and structural position of the rams are such that the scissor-lever assemblies 50 can collapse entirely when the rams are retracted and reach their maximum extension when the rams are fully extended. Naturally, the fastening bolts 63 and 73 provide supporting axles with respect to the post 78 and brace 58, respectively, for each ram to pivot as it expands and contracts.

The two hydraulic rams 76 are actuated according to proven and well known technology by a hydraulic pump driven by an electrical motor. All components are housed in the area within the support frame 60 and under the wheelchair platform 20, so that the platform itself represents the total extent of the area occupied by the invention to allow for its use in a more constrained space than possible with prior art lifts. In addition, the height of each component is minimized to achieve a profile as low as possible for easy access when the platform is completely lowered. Therefore, although the hydraulic system used in this invention consists of standard components, its configuration is chosen with the objective of permitting the lowest possible profile for the unit.

Figure 5:
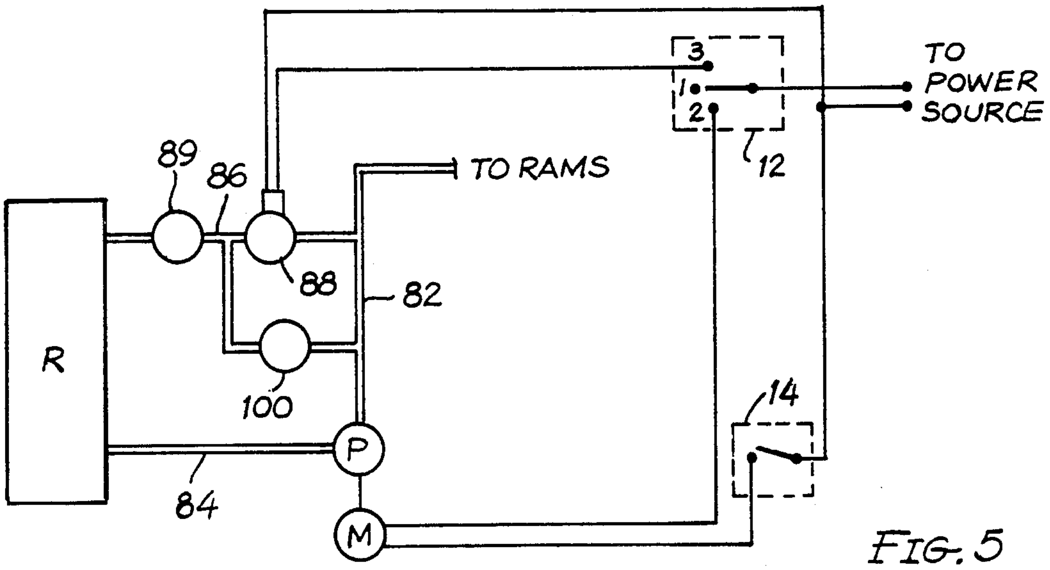
FIG. 5 is a schematic diagram of the hydraulic system used in the preferred embodiment of the invention.

As shown in schematic form by way of illustration in FIG. 5, a hydraulic fluid reservoir R is connected in standard fashion to a hydraulic pump P, which is driven by an electric motor M. This motor can be powered by any compatible source, such as a utility AC line or a DC battery, and it is actuated by a three-way switch 12 mounted on one of the side rails 32 (seen in FIG. 1). As the switch 12 is moved from a first, normally-open position to a second, closed position, power is delivered to the motor M which in turn drives the pump P and causes the fluid to be pumped at high pressure into the rams 76 through a system of hydraulic hoses 82. The fluid is stored in the reservoir R, which is connected to the suction side of the pump P by standard hydraulic conduit 84. A high pressure return line 86 connects the discharge port of each ram with the fluid reservoir through at least one electrically actuated return valve 88 and a regulator valve 89 to control fluid flow during the operation of the lift. When the switch 12 is in its second position, the return valve is closed and the pump forces the hydraulic fluid at high pressure into the cylinders of the rams 76, thus causing the extraction of the piston rods 74, which in turn force the opening of the scissor-lever assemblies and the lifting of the wheelchair platform. A normally closed, mechanically actuated limit switch 14 may be incorporated in the system to open the power circuit and interrupt the lifting operation when a certain elevation is reached. For example, although not shown in the figures, the lift device described here features a limit switch mounted on the front edge of the platform that is actuated by a trigger lever purposely affixed at a predetermined height on surrounding fixtures, such as a wall or piece of furniture. Once the lifting is interrupted, either by returning the switch 12 to its first position at any elevation or by the automatic action of the limit switch at the maximum height, all movable components in the lift are locked in place by the hydraulic system and the platform 20 remains at the same height indefinitely.

When the switch 12 is moved to its third position, it closes a different, normally-open circuit that controls the return valve 88. This solenoid-driven valve is then opened and the hydraulic fluid in the system is released, so that the pressure exerted by the weight of the platform on the rams will cause them to contract and force the fluid to return to the reservoir R through the return valve. The regulator valve 89 is usually inserted in the return line to guarantee uniform flow and a smooth motion of the platform. A separate, mechanically actuated and normally closed return valve 100 is included in the system to permit the release of the hydraulic fluid from the rams in case of power failure. This valve is actuated through a mechanical linkage 104 by a lever 102 mounted on the side rail 32 of the wheelchair lift (see FIG. 1), so that a disabled person could easily lower the platform in case of an emergency. A ring 106 is also included in this embodiment of the invention in order to facilitate the actuation of the emergency lever by people who have limited use of their hands.

Figure 4:
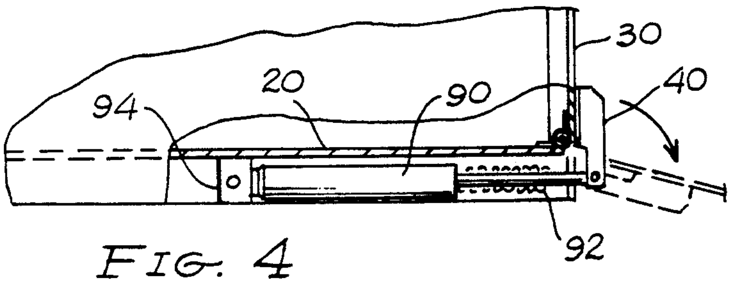
FIG. 4 is a cross-sectional view of the wheelchair lift taken from line 4—4 in FIG. 1, illustrating the hydraulic mechanism controlling the opening and closing of the back panel.

As mentioned above, the back panel 30 of the platform is rigidly attached to a lever arm 40 which is actuated by a hydraulic ram that controls the position of the panel in its motion around the set of hinges 24. FIG. 4 shows the cooperative operation of the hydraulic ram 90, connected to the hydraulic system described above, and the spring 92 to move the back panel 30 from a closed, back-stop position when the platform is elevated to an open, ramp position when it is lowered at ground level. The spring 92 connects the lever arm 40 to a fixed post 94 and is always under tension, pulling the arm to cause the back panel 30 to open. The ram 90, on the other hand, is anchored to the same points on the lever arm 40 and the post 94 but pushes the panel closed as it expands under hydraulic pressure. Thus, when the fluid pressure is released from the ram 90, the spring 92 pulls the back panel 30 open against the back pressure of the freely discharging fluid in the cylinder of the ram; when the ram is actuated, the expansion of its piston rod pushes the lever arm 40 outwardly and causes the back panel 30 to swing shut against the pulling force of the spring 92. The shut position is firmly maintained by the continuing pressure in the hydraulic system until it is released by actuating the return valve. Since the pressure exerted by the weight of the platform on the lifting rams 76 is much greater that the pressure exerted by the back panel 30 and the spring 92 on the control ram 90, the hydraulic system will operate preferentially on ram 90 when pressurized and on rams 76 when depressurized. Thus, it will first shut the back panel and then lift the platform, when pressurized, and first lower the platform and then allow the spring to open the panel, when the pressure is released. This insures safety of operation of the device by not permitting the opening of the back panel and the possible accidental fall of a wheelchair when the platform is elevated.

Various changes in the details, steps and materials that have been described may be made by those skilled in the art within the principles and scope of the invention herein illustrated and defined in the appended claims. For example, a system of scissor-lever assemblies with only two levers on each side could be designed to reduce the space occupied by the elevator frame, thus further lowering the profile of the platform and improving its accessibility. In addition, when the anticipated use is in a permanent location, a foundation space could be formed to house the support frame 60 of the invention, thus lowering the platform to ground level and facilitating the process of wheelchair access. Similarly, the front panel 34 could be hinged either on one of the side rails or on the platform to allow it to swing open for access to an elevated site.

Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus and methods.

I claim:

1. A lift for raising the elevation of an occupied wheelchair, comprising:

(a) a horizontal platform for supporting said wheelchair, said platform further comprises two side rails, a vertical front panel, and a vertical back panel, hinged along the back side of the platform, that can swing open to rest on the surrounding ground and provide a ramp for a wheelchair to be wheeled onto the lift when the platform is lowered all the way;

(b) means for raising and lowering said platform in vertical motion between a height approximately at ground level and a higher elevation, as desired by the person occupying said wheelchair, said means for raising and lowering said platform consists of two extendable scissor-lever assemblies connected to the underside of said platform and to a support frame on the ground, and first and second hydraulic rams hinged between said support frame and a transverse brace rigidly connecting said scissor-lever assemblies, so that said platform reaches a point of maximum travel and highest elevation when said scissor-lever assemblies and said first and second rams are fully extended, and said platform is at its lowest point when said scissor-lever assemblies and said first and second rams are fully retracted; and (c) a third hydraulic ram and a spring connected in parallel to the underside of said platform and to a lever arm rigidly attached to said back panel, so that the hydraulic pressure of said third ram causes said back panel to remain closed in its vertical position against the tension of said spring and the release of said hydraulic pressure from said third hydraulic ram results in said spring to pull said back panel open against the back pressure of the released hydraulic fluid in said third ram.

2. The lift defined in claim 1, wherein said hydraulic rams are actuated by a hydraulic pump driven by a motor powered by electricity in a hydraulic circuit containing a normally-closed electrical return valve and a regulator valve, wherein the delivery of electrical power to said motor is controlled by a first actuating position of an electrical switch mounted on one of said side rails and the opening of said electrical return valve is controlled by a second actuating position of said electrical switch.

3. The lift defined in claim 2, wherein said hydraulic circuit further comprises a normally-closed mechanical return valve in parallel with said electrical return valve and controlled by a manual lever mounted on one of said side rails.

4. The lift defined in claim 3, further comprising a normally-closed electrical limit switch in series with said electrical switch's first actuating position and mounted on said platform for actuation by a trigger lever purposely affixed at a predetermined height.

5. The lift defined in claim 4, wherein said front panel is hinged to one of said side rails to allow it to swing open for access to an elevated site.

6. The lift defined in claim 4, wherein said front panel is hinged to the front edge of said platform to allow it to swing open for access to an elevated site.

* * * * *